March 28, 1933. V. SAHMEL 1,903,070
CONTROL SYSTEM FOR ROTARY KILNS AND THE LIKE
Filed Feb. 18, 1930 4 Sheets-Sheet 1
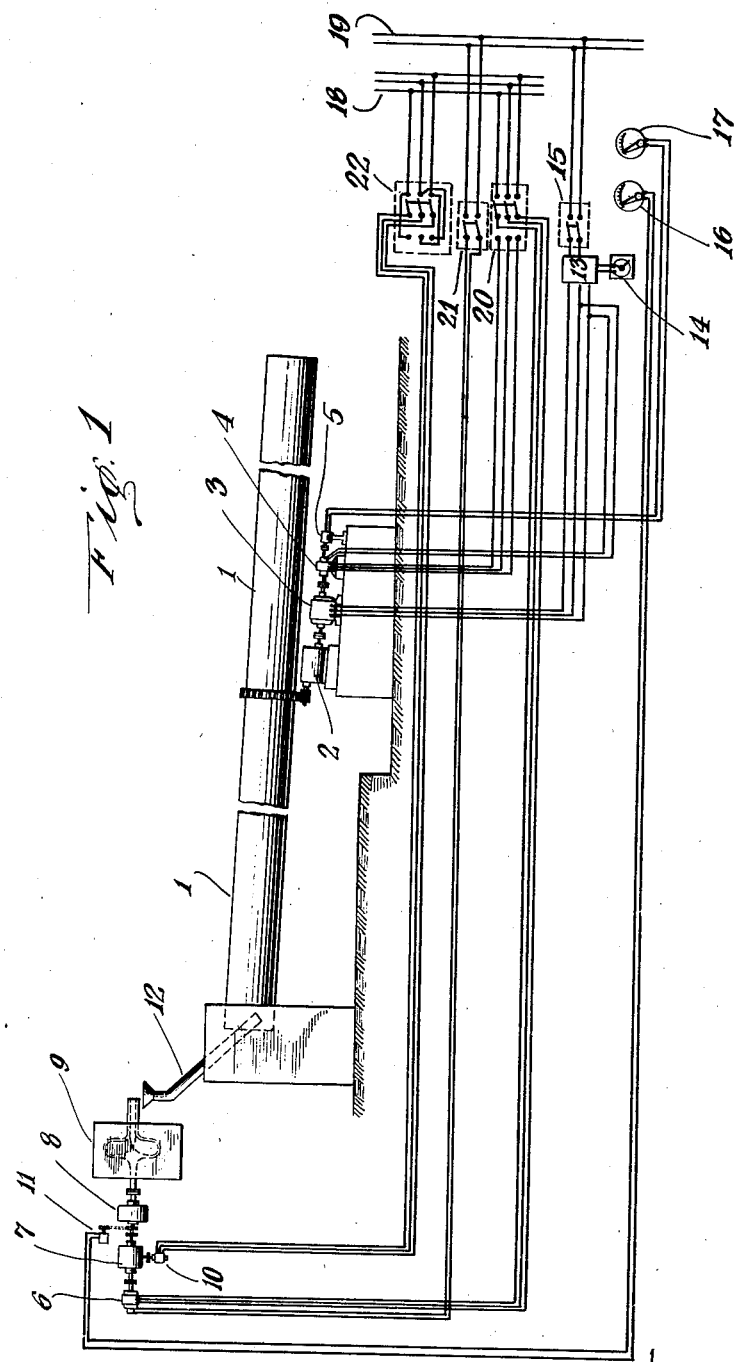

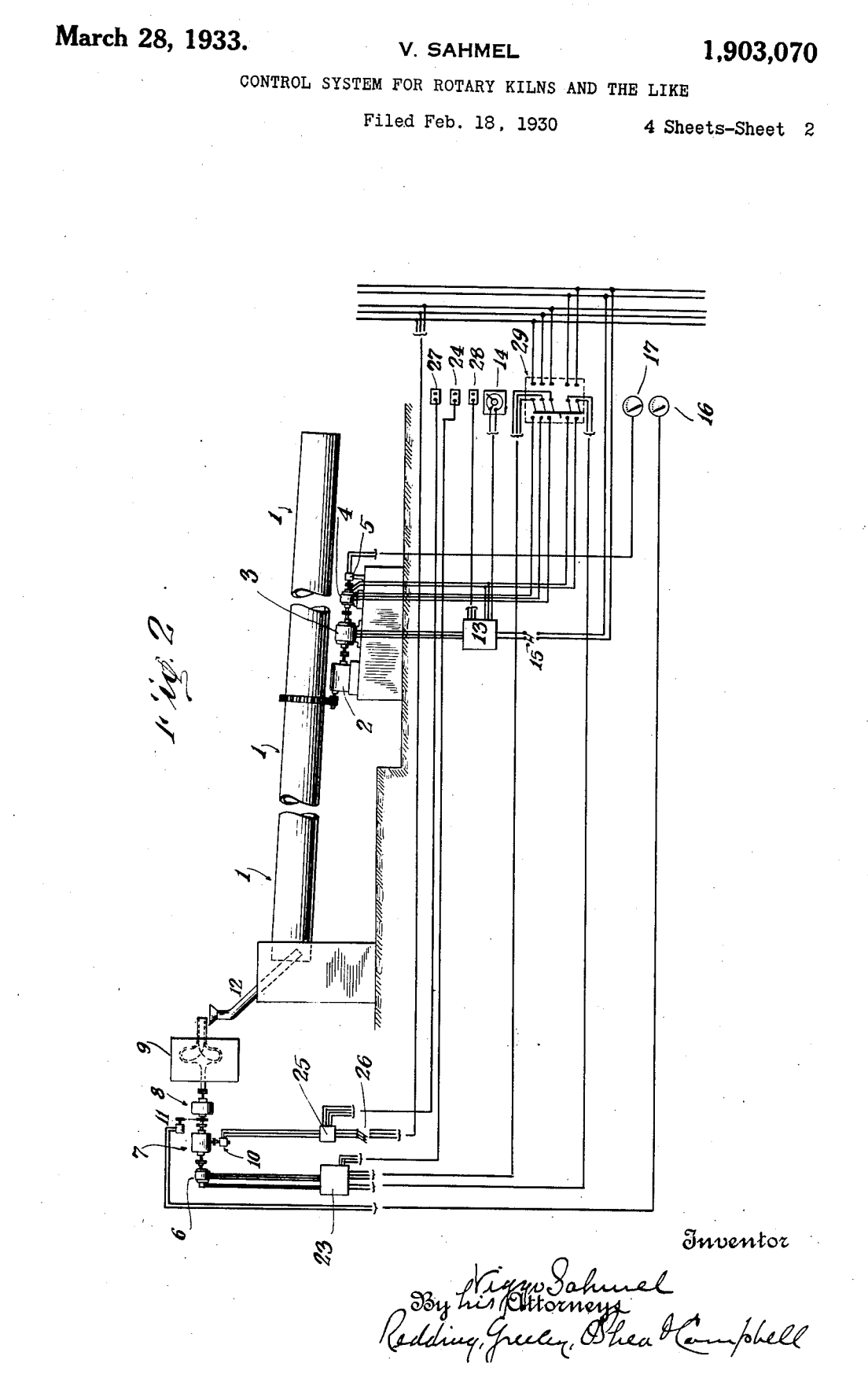

March 28, 1933.                V. SAHMEL                  1,903,070
          CONTROL SYSTEM FOR ROTARY KILNS AND THE LIKE
                  Filed Feb. 18, 1930        4 Sheets-Sheet 2

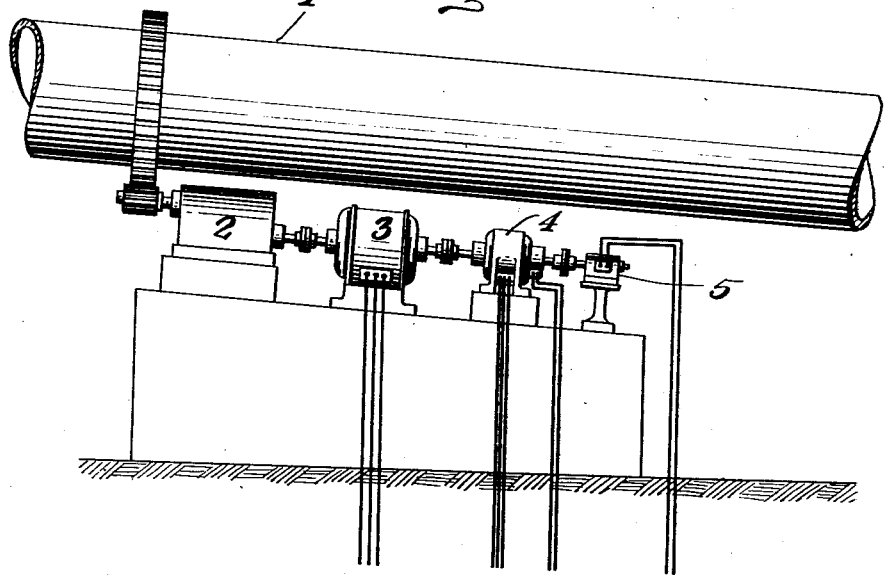
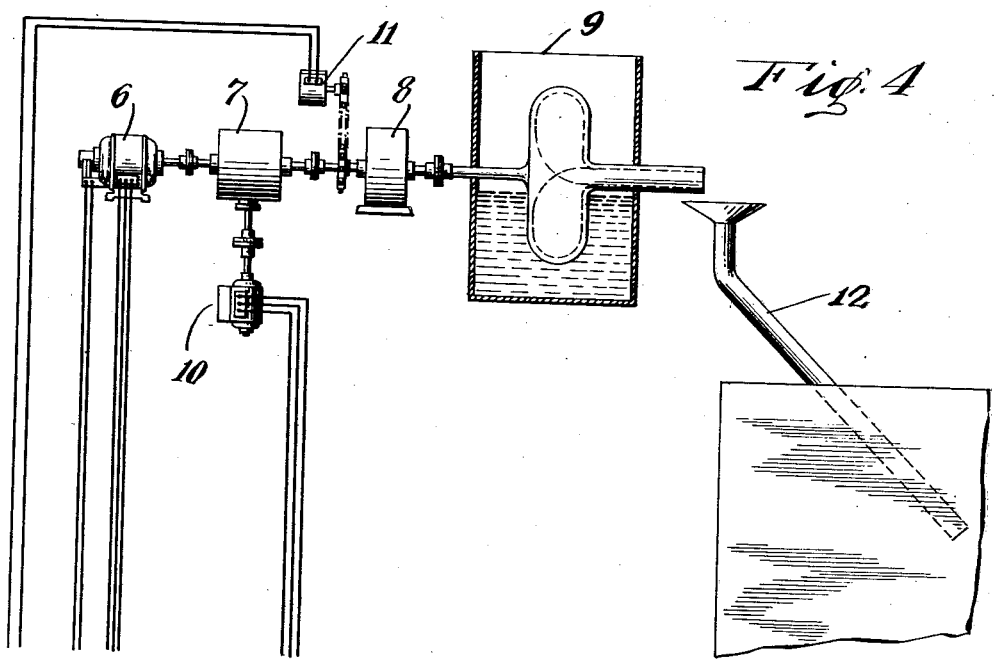

March 28, 1933. V. SAHMEL 1,903,070
CONTROL SYSTEM FOR ROTARY KILNS AND THE LIKE
Filed Feb. 18, 1930 4 Sheets-Sheet 4
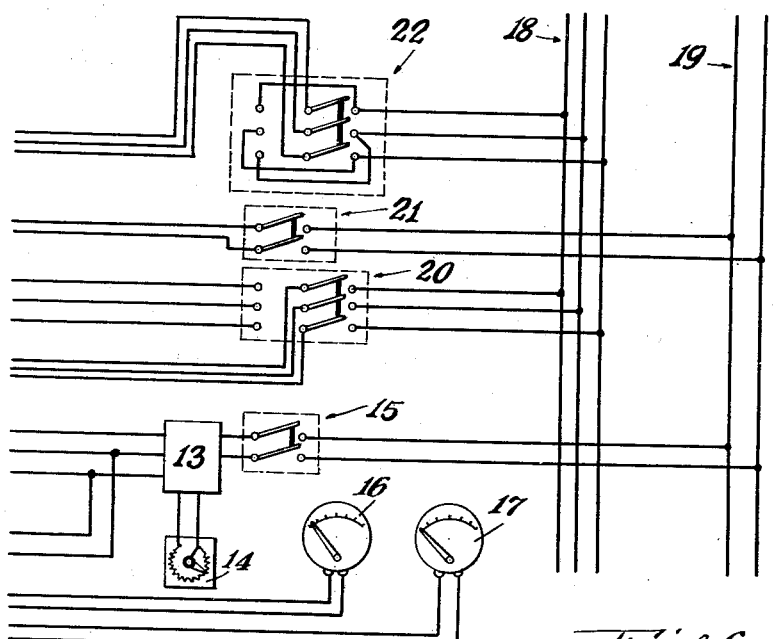
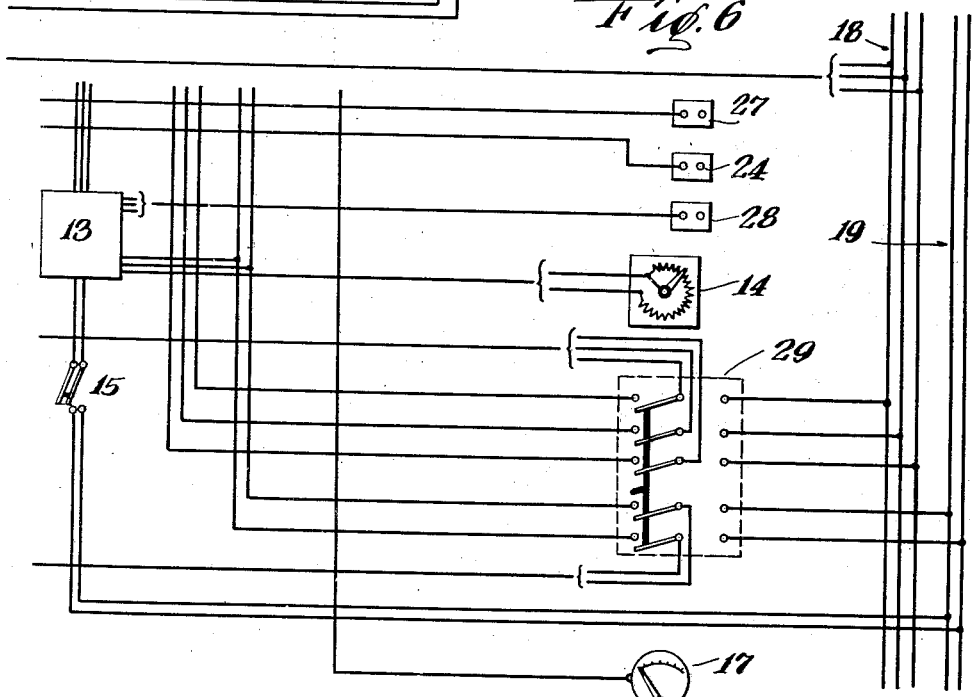
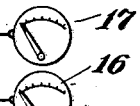

Patented Mar. 28, 1933

1,903,070

UNITED STATES PATENT OFFICE

VIGGO SAHMEL, OF FOREST HILLS, NEW YORK, ASSIGNOR TO F. L. SMIDTH & CO., OF NEW YORK, N. Y., A CORPORATION OF NEW JERSEY

CONTROL SYSTEM FOR ROTARY KILNS AND THE LIKE

Application filed February 18, 1930. Serial No. 429,251.

In earlier days of the cement industry, when rotary kilns, in which the calcining and sintering of cement material was effected, rarely reached a length as great as 100 feet with an output capacity of 500 barrels per day, it was possible to maintain an approximately correct speed relation between the feeding devices and the kiln by mechanical means, such as a rope drive or chain drive, the purpose being to insure the feed of the material to the kiln at a rate approximately proportional to the speed of rotation of the kiln and thereby attain both maximum efficiency and uniformity in quality of the product. The ideal in kiln operation is high and constant speed with correspondingly uniform flow of material, fuel and oxygen to support combustion. This ideal, however, is difficult if not impossible of attainment, because of changes in conditions of operation. Moreover, changes in the character of the material to be treated or of the fuel used for heating the kiln make it necessary to increase or decrease the rate of feed of the material, or even to provide for instant interruption of the normal feed. It is also desirable to give the operator, particularly during the starting up of the operation, a wide range in the determination of the rate of feed of the material.

In the operation of modern cement plants, in which the kilns are of much greater length than in the earlier days, sometimes having a length as great as 400 feet, with a corresponding increase in output, the maintenance of the proper speed relation between the feeding devices and the kiln has become practically impossible with mechanical devices and efforts have been made to effect the desired speed relation by electrical devices, but so far as such electrical control devices have been developed before the present invention they have been proved wholly unsatisfactory in operation. Variation in temperatures or voltage have caused the kiln drive motor and the feed drive motor to respond differently under different conditions. Again, the attempt to control the feed of the material by intermitting the feed from time to time has been found to fail to maintain the desired relative rate of feed.

In accordance with the present invention the desired results are secured by causing alternating electrical current to be generated at frequencies in exact correspondence with the speed of the kiln that is, by making the frequencies of the current generated a direct function of the speed of the kiln, and operating the feed drive motor by such current whereby the feed mechanism will be operated always at a rate which varies with and is in correspondence with the speed of rotation of the kiln. Thus, if the operating speed range of the kiln is taken to be from $\frac{1}{2}$ R. P. M. to 2 R. P. M. the generator of alternating current in operative relation with the kiln would be so designed as to generate alternating current, for example, from 20 cycles to 80 cycles, or from 60 cycles to 240 cycles. The motor of the feed drive would be designed correspondingly so as to operate in substantial correspondence with the varying frequencies with the alternating current. The motor may be of the synchronous type but an induction motor (asynchronous) might be used if the slip values follow the feed characteristic of the feeding mechanism at the prescribed frequencies.

In the accompanying drawings in which the invention is illustrated as applied to a rotary cement kiln of usual form, with associate feeding devices, also of usual form, except as hereinafter indicated—

Figure 1 is a view, partly in elevation, partly broken out, and partly diagrammatic, of an apparatus to which the improved control system is applied.

Figure 2 is a view similar to Figure 1, but illustrating a slight modification in respect of the electrical control system, provision being made for automatic regulation in some particulars to be referred to.

Figures 3 and 4 are views in outline, on a larger scale, of some parts common to both Figures 1 and 2.

Figure 5 is a view on a larger scale of the electrical connections shown at the right hand of Figure 1.

Figure 6 is a view on a larger scale of the electrical connections shown at the right hand in Figure 2.

In both Figures 1 and 2 a rotary kiln 1, supported in the usual manner, is shown as driven through suitable reduction gearing at 2 by a motor at 3. This motor may be either of the direct current type or of the alternating current type as may be preferred.

Operatively associated with the kiln 1, so that its speed shall be directly dependent upon the speed of rotation of the kiln 1, is a generator 4, which in this instance is shown as operatively associated with the kiln through the medium of the kiln drive motor 3 to which it is coupled. This generator is here represented as an alternating current generator. Operatively associated with the generator is a magneto, indicated at 5, which actuates a speed indicator 17 at the kiln operator's stand.

At 6 is represented a drive motor which is operatively associated with the feed mechanism at 9 through a mechanical speed transformer of ordinary construction at 7, and a speed reducer, also of ordinary construction, at 8. The speed transformer 7, the function of which is to determine the speed at which the feed mechanism is driven, may be regulated directly by hand, or by a pilot motor 10 controlled from the operator's stand. With some part of the feed drive, as with the speed reducer 8, may be associated operatively a magneto 11 by which is actuated a speed indicator 16 at the operator's stand. The feeder 9 is shown as of the ordinary scoop type and by means of the speed transformer 7 the speed of the feeder and therefore the rate of delivery of the material to the kiln may be changed to suit the conditions of operation of the kiln, it being understood that the rate of speed is normally a direct function of the speed of rotation of the kiln to which the cement material is delivered by the feeder as through a chute 12.

In the embodiment of the invention illustrated in both Figures 1 and 2 the power supply for the kiln drive is represented as delivered through 3-phase alternating current buses 18 and direct current buses 19.

As thus far described the arrangements shown in Figures 1 and 2 may be regarded as identical.

Referring now more particularly to the arrangement shown in Figures 1 and 5 there is represented at 13 a starting device connected electrically with the kiln drive motor 3 under the control of a speed regulator 14, current being supplied to the starting device from the direct current buses 19 through a main, direct current feed switch, indicated at 15. The feed drive motor 6 is shown as capable of being connected either with the alternating current buses 18 or with the generator 4, as conditions may require, through a 3-pole, double throw switch, indicated at 20. The feed drive motor 6 is also shown as capable of being connected with or disconnected from the direct current buses 19 through a double pole, single throw switch, indicated at 21. The pilot motor 10, of the speed transformer 7 may be controlled by the operator, for the purpose of changing the speed of the feeder with respect to the speed of rotation of the kiln, if so desired, through a 3-pole, reversing switch, indicated at 22.

It will be understood that while no fixed procedure can be prescribed for the starting up and the running of the kiln under different conditions, the following may be taken as a description of the starting up and continued operation of the kiln under normal conditions. Under such conditions, the switch 15 would first be closed, the speed of the kiln drive motor and of rotation of the kiln being determined by the proper setting of the speed regulator 14, the speed being observed through the medium of the speed indicator 17. The 3-pole, double throw switch 20 is then thrown in such a way as to connect the generator 4 with the synchronous feed drive motor 6, the double pole, single throw switch 21 being closed at the same time. The excitation current for the generator 4, as will be observed by tracing the connections, is supplied through the closing of the switch 15 for the purpose of starting the kiln drive motor 3. The 3-pole, reversing switch 22 normally in neutral position, may be thrown by the operator to effect a proportional increase or decrease in the rate of flow as conditions may require, the speed of the feed mechanism being observed by the operator through the speed indicator 16 which is actuated by the motor 6.

In this manner it is possible for the operator to give his entire attention to the functioning of the kiln, being assured that the rate of feed will be always proportionate to the speed of the kiln, without any danger of so-called bare spots in the kiln which would result from intermittent operation of the feeder. Through the provision of the 3-pole, double throw switch 20 it is possible for the operator at any time, as in starting up, to operate the feeding mechanism at a rapid rate, and at times, by shifting the switch, to make the speed of the feeder proportionate to the speed of rotation of the kiln. In this way, also, it is possible for the operator to calibrate the feeder with the kiln at a standstill, and at any time to stop the feed completely by throwing the switch 20 into neutral position.

Referring now more particularly to the arrangement shown in Figures 2 and 6 it will be noted first that in this arrangement a remote control, push button operated starter is provided for the starting device 13 which may thus be located in convenient proximity to the kiln drive motor 3, whereas in Figures 1 and 5 the starting device is represented as located at the operator's stand, with a hand control device 14 directly connected therewith.

In Figure 2 there is also represented in proximity to the feed drive motor 6 an automatic starting switch 23 which may be controlled from the operator's stand by means of a push button 24. There is also shown in proximity to the speed transformer 7 a reversing contactor 25 which may be controlled from the operator's stand by means of a push button 27. A disconnecting switch 26 for the pilot motor 10, and located in proximity thereto is shown as connected electrically with the alternating current buses 18. Finally, there is shown in Figures 2 and 6 a 5-pole, double throw switch 29 which is normally closed so as to connect the generator 4 and the starter 23, but may serve also, when drawn into the opposite position, for the purpose of operating the feed drive motor from the direct current buses 19 and alternating current buses 18.

The operation of the arrangement shown in Figures 2 and 6, as will be observed, is substantially the same as that of the arrangement shown in Figures 1 and 5 and no further explanation is necessary.

It will be understood that various changes in details of construction and arrangement can be made to suit different conditions of use and that, except as pointed out in the claims the invention is not restricted to the particular constructions and arrangements shown and described herein.

I claim as my invention:

1. The combination with a rotary kiln of an alternating current generator, operating devices for the generator whereby the frequencies of the current generated are a direct function of the speed of the kiln, a feeding mechanism for the kiln, an alternating current motor for the feeding mechanism operated in substantial synchronism with the generator, electrical connections between the generator and the motor, whereby the feeding mechanism is driven at a speed proportionate to the speed of rotation of the kiln, and independent means for controlling the rate of feed of the feeding mechanism.

2. The combination with a rotary kiln of an alternating current generator, operating devices for the generator whereby the frequencies of the current generated are a direct function of the speed of the kiln, a feeding mechanism for the kiln, an alternating current motor for the feeding mechanism operated in substantial synchronism with the generator, electrical connections between the generator and the motor, whereby the feeding mechanism is driven at a speed proportionate to the speed of rotation of the kiln, and means whereby the motor for the feeding mechanism may be operated independently of the generator.

3. The combination with a rotary kiln of an alternating current generator, operating devices for the generator whereby the frequencies of the current generated are a direct function of the speed of the kiln, a feeding mechanism for the kiln, an alternating current motor for the feeding mechanism operated in substantial synchronism with the generator, a source of electric current supply, and means whereby the motor may be coupled with the generator or with the electric current supply.

4. The combination with a rotary kiln of an alternating current generator, operating devices for the generator whereby the frequencies of the current generated are a direct function of the speed of the kiln, a feeding mechanism for the kiln including a speed transformer, an alternating current motor for the feeding mechanism operated in substantial synchronism with the generator, electrical connections between the generator and the motor, and means under the control of the operator to control the speed transformer.

This specification signed this 8 day of February A. D. 1930.

VIGGO SAHMEL.